United States Patent [19]

Koike

[11] Patent Number: 4,879,099
[45] Date of Patent: Nov. 7, 1989

[54] CATALYST BASKET FOR DENITRATION FOR USE IN AN EXHAUST GAS PASSAGE

[75] Inventor: Hitoshi Koike, Kure, Japan

[73] Assignee: Ishikawajima-Harima Jukogyo Kabushiki Kaisha, Japan

[21] Appl. No.: 881,820

[22] Filed: Jul. 3, 1986

[30] Foreign Application Priority Data

Jul. 8, 1985 [JP] Japan ............................ 60-102853[U]

[51] Int. Cl.$^4$ ............................................ B01T 32/00
[52] U.S. Cl. ..................................... 422/177; 422/179; 422/190; 422/232; 423/239
[58] Field of Search ............... 422/171, 177, 179, 190, 422/232; 423/239

[56] References Cited

U.S. PATENT DOCUMENTS

| | | | |
|---|---|---|---|
| 2,718,460 | 9/1955 | Bowen III | 422/171 |
| 4,163,042 | 7/1979 | Lynch | 422/179 |
| 4,238,455 | 12/1980 | Ogiwara | 422/171 |
| 4,305,910 | 12/1981 | Kudo et al. | 422/179 |
| 4,322,386 | 3/1982 | Masutomi et al. | 422/171 |
| 4,544,525 | 10/1985 | Honda et al. | 422/171 |

FOREIGN PATENT DOCUMENTS

| | | | |
|---|---|---|---|
| 2332955 | 6/1973 | Fed. Rep. of Germany | 422/171 |
| 15266 | 2/1978 | Japan | 422/171 |
| 71766 | 6/1979 | Japan | 422/171 |
| 97235 | 7/1980 | Japan | 422/171 |

*Primary Examiner*—Barry S. Richman
*Assistant Examiner*—L. Kumment

[57] ABSTRACT

Handling of catalytic reduction catalyst elements used for denitration can be facilitated. The catalyst elements are changed in a basket comprising a hollow body which is made of steel so as to permit the passage therethrough of exhast gases from one end to the other end thereof, a catalyst element supporting member which is disposed at the bottom of said hollow body, upon which are placed the catalyst elements and which is adapted to permit the passage of exhaust gases therethrough, and ceramic shock absorbers interposed between the inner surfaces of the hollow body, and the catalyst elements charged therein. The catalyst elements charged in each basket can be handled as a unit and placed upon shelves disposed in an exhaust gas passage.

7 Claims, 3 Drawing Sheets

CATALYST BASKET FOR DENITRATION FOR USE IN AN EXHAUST GAS PASSAGE

BACKGROUND OF THE INVENTION

The present invention relates to a novel catalyst basket for denitration and more particularly a catalyst basket which is used for denitration by a dry $NH_3$ catalytic reduction method and which is disposed in an exhaust gas passage of a boiler or the like to remove nitrogen oxides ($NO_x$) contained in exhaust gases.

The dry $NH_3$ catalytic reduction method is well known in the art as a method for removing nitrogen oxides ($NO_x$) contained in exhaust gases. According to this method, $NH_3$ reduction catalysts for denitration are disposed in an exhaust gas passage.

With a denitration device accomplishing the dry $NH_3$ catalytic reduction method in an exhaust gas discharge system for an automobile, it is well known in the art that a basket made of hard ceramics or steel and filled with catalysts is inserted into an exhaust gas passage of the exhaust gas discharge system. The single basket will suffice for this use since the exhaust gas passage is relatively small in inner diameter and the catalysts charged thereinto are accordingly smaller in size.

Meanwhile, an exhaust gas passage of an exhaust gas discharge system for a boiler or incinerator is in general three to ten meters in diameter and each catalyst element inserted into the passage is 100–150 mm in diameter and 700–1,500 mm in length. Such catalyst elements are arranged thousands to ten thousands in number to provide a denitration device.

With the denitration device carrying out the dry $NH_3$ catalytic reduction method in the exhaust gas passage of a large-sized boiler or incinerator, relatively large catalyst elements are arranged thousands or ten thousands in number in the exhaust gas passage as described above so that catalyst element insertion operation itself is troublesome. Moreover, handling of the individual catalyst elements is difficult to carry out since the catalyst elements are sintered products and are easily susceptible to impact forces.

The catalyst elements are disposed on shelves in the exhaust gas passage. Direct disposition of the individual catalyst elements on the shelves will necessitate the shelves to have larger cross sections from the view point of mechanical strength, which may adversely affect passage of the exhaust gases and may accelerate accumulation of ash contained in the exhaust gases.

The present invention was made to overcome the above and other problems encountered in the conventional dry $NH_3$ catalytic reduction type denitration device disposed in the exhaust gas passage of a large-sized boiler or incinerator and has for its object to provide a catalyst basket for denitration which makes it possible to handle a plurality of catalyst elements as a unit so that the protection and handling of the catalyst elements are ensured. Another object of the present invention is to provide a catalyst basket for denitration whereby a plurality of units of catalyst elements are disposed in the exhaust gas passage, thus providing a denitration device.

The above and other objects, effects, features and advantages of the present invention will become more apparant from the following description of a preferred embodiment thereof taken in conjunction with the accompanying drawings.

DETAILED DESCRIPTION OF THE PREFERRED EMBODIMENT

A preferred embodiment of the present invention will be now described with reference to the accompanying drawings.

Figure 1:
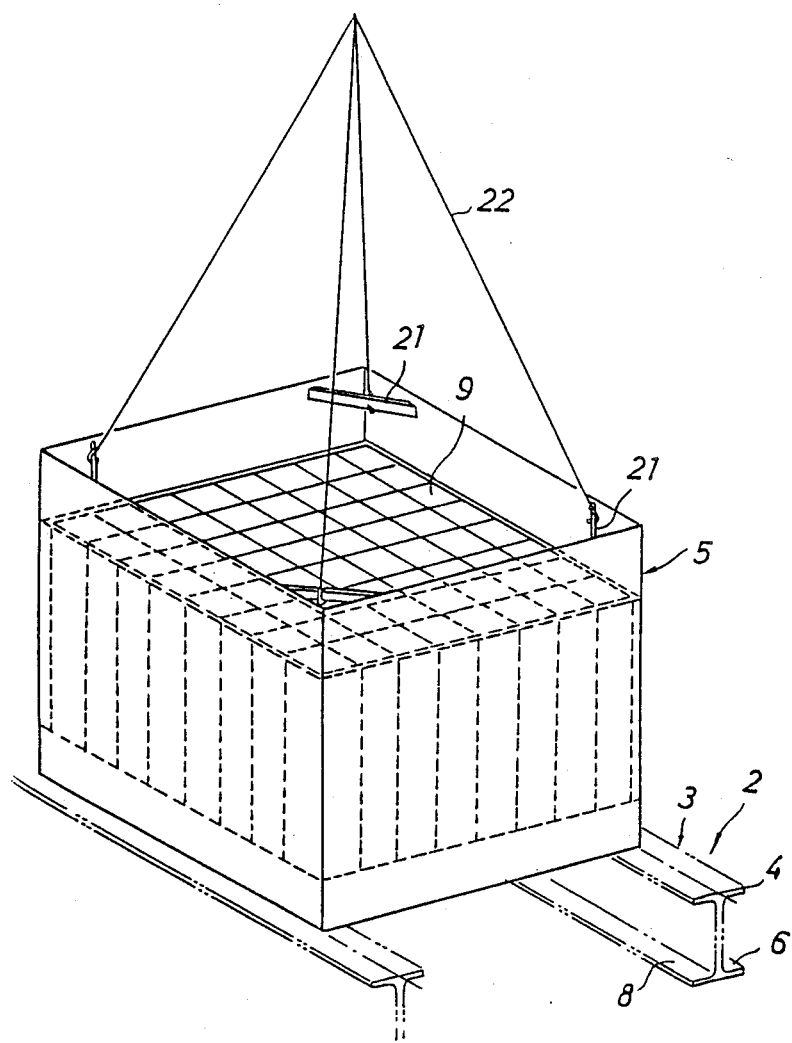
FIG. 1 is a perspective view of a preferred embodiment of the present invention.
Figure 2:
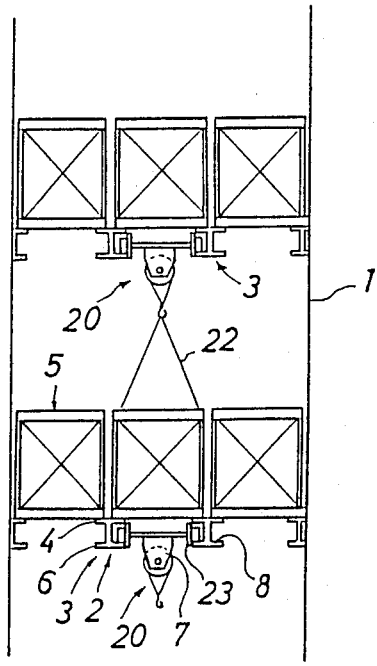
FIG. 2 is a vertical sectional view illustrating the catalyst baskets in accordance with the present invention disposed in the exhaust gas passage, thus providing a denitration device.
Figure 5:
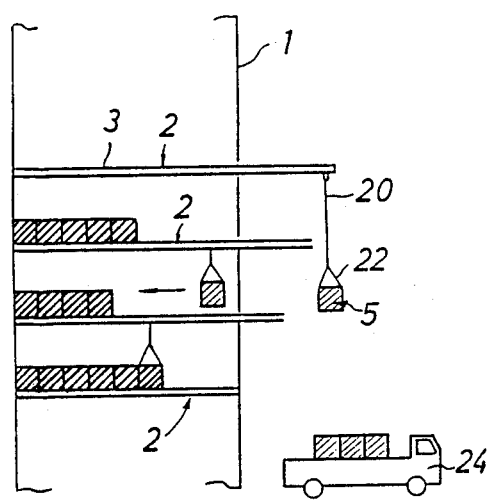
FIG. 5 is a schematic vertical sectional view illustrating a denitration device in which the catalyst baskets in accordance with the present invention are disposed in the exhaust gas passage.
Figure 6:
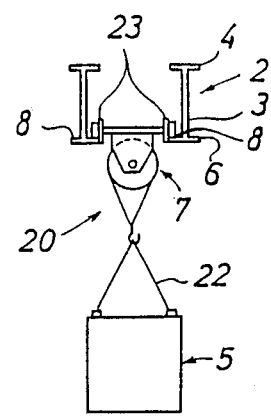
FIG. 6 is a side view of a catalyst basket transportation means.

As shown in FIGS. 1 and 2, shelves 2 are disposed in an exhaust gas passage 1 of an exhaust gas discharge system of a boiler or the like. The shelves 2 are spaced apart from each other by a predetermined distance in the axial direction of the exhaust gas passage 1 as shown in FIGS. 2 and 5. Each shelf 2 comprises a beam 3 made of an H- or I-shaped steel and having an upper flange 4 upon which is placed a catalyst basket 5 to be described in detail hereinafter. The lower flange 6 of the beam 3 defines a guide rail 8 for a hoist 7 to be described in detail hereinafter. The beams 3 are spaced apart from each other by a relatively great distance and extend in one direction within the exhaust gas passage 1. The shelves 2 are arranged such that opposite side edges of each basket 5 are placed over the beams 3 which are in parallel with each other.

Figure 3:
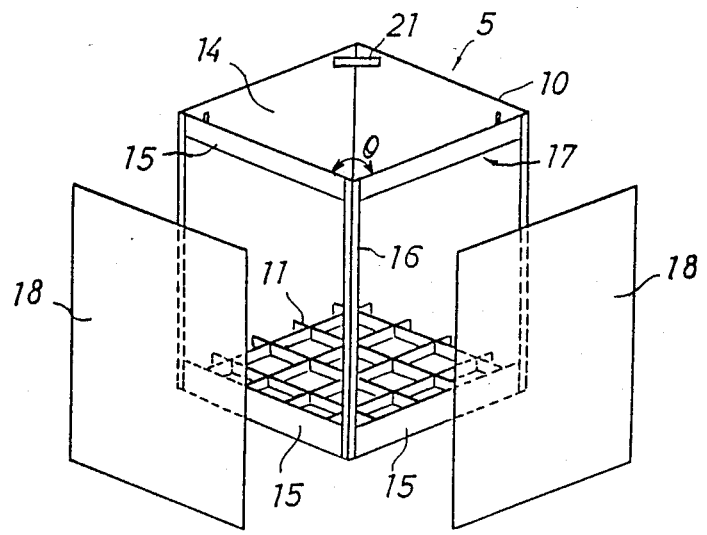
FIG. 3 is an exploded perspective view of a catalyst basket in accordance with the present invention used to explain the assembly thereof.
Figure 4:
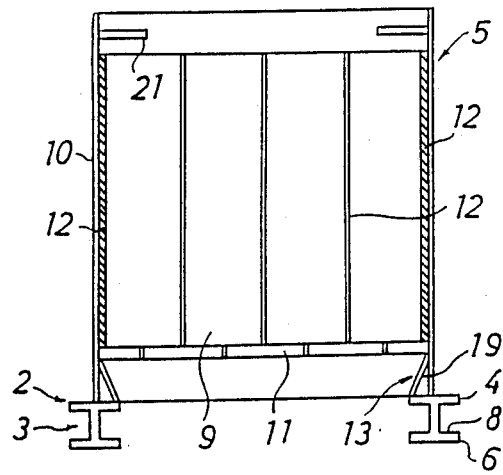
FIG. 4 is a vertical sectional view of the catalyst basket of the present invention.

As shown in FIGS. 1, 3 and 4, the catalyst basket 5 in accordance with the present invention which is placed on the shelves 2 of the type described above, comprises a steel hollow body 10 adapted to permit the flow therethrough of exhaust gases from its one end to the other end and to be charged with reduction catalyst elements 9, a catalyst element supporting member 11 which is disposed at the bottom of the hollow body 10 so as to permit the flow therethrough of the exhaust gases and which is for example in the form of a grid as shown, ceramic shock absorbers 12 interposed between the inner surfaces of the hollow body 10 and the reduction catalyst elements 9 charged into the hollow body 10 and an ash accumulation preventative member 13 which is attached to the hollow body 10 and is adapted to prevent the accumulation of ash contained in the exhaust gases when the latter flow through the reduction catalyst elements 9 disposed on the shelves 2 in the exhaust gas passage 1.

The hollow body 10 may be square or rectangular in cross section. More particularly, as shown in FIG. 3, a steel plate 14 is bent substantially in the form of a letter L to form two walls of the body 10 which define two sides of the square or rectangle. In order to define the other two sides of the square or rectangle, upper and lower L-shaped frames 15 are attached to the two walls of the body 10 such that each of the frames 15 includes an angle θ between its two arms. An angle-shaped corner member 16 interconnects the frames 15 with the included angle θ. Thus, the other two sides of the square or rectangle are defined by a frame body 17 with the upper and lower frames 15 and the corner member 16. Side walls 18 are detachably attached to the frame body 17.

Therefore, when the side walls 18 are detached or removed, the interior of the hollow body 10 is accessible from its sides.

As shown in FIGS. 3 and 4, securely attached to the bottom of the body 10 by welding or the like is the catalyst element supporting member 11 which has a predetermined height, upon which a plurality of reduction catalyst elements 9 are placed and which is in the form of a grid comprising parallel or cross plates so as to permit the smooth passage of the exhaust gases.

The catalyst element supporting member 11 may take any other configuration as far as it can sufficiently receive the vertical loads of the catalyst elements 9 while the cross section of the member 11 is reduced to a minimum, whereby the ineffective surfaces of the catalyst elements 9 can be reduced to a minimum.

The ash accumulation preventive member 13 comprises inclined plates 19 which converge downwardly from the inner surfaces of the hollow body 10. The ash accumulation preventative member 13 is so arranged that it is inclined downwardly from the bottom inner surfaces of the basket 5 placed upon the upper flanges 4 of the beams 3 which constitute the shelves 2. Therefore, the accumulation of ash on the beams 3 and the inner surfaces of the hollow body 10 can be prevented. Furthermore, the lower end of the ash accumulation preventative member 13 is seated on the beams 3 of the shelves 2 so as to constitute a reinforcing member for receiving the vertical load of the basket 5.

It follows therefore that the ash accumulation preventive member 13 is attached to the lower portions of the hollow body 10 which are directly seated on the beams.

A suspension member 21 for engagement with a lift chain 22 of a basket transportation means 20 such as a hoist to be described in detail hereinafter is securely attached to each corner of the hollow body 10.

As shown in FIG. 4, the ceramic shock absorbers 12 are attached to the inner surfaces of the hollow body 10 and are also interposed between the catalyst elements 9 charged into the hollow body 10. The absorbers 12 are fabricated by compressing ceramic fibers or paper by about 50%.

Next referring to FIGS. 2 and 5, the basket transportation means 20 is disposed such that it can freely travel along the guide rails 8 defined by the lower flanges 6 of the beams 3 of the shelves 2. The transportation means 20 comprises wheels 23 adapted to run along the guide rails 8 and a hoist 7 suspended from the wheels 23. The hoist 7 includes a suspension chain 22 which can be freely wound or rewound. The chain 22 engages with the suspension members 21 of the basket 5 so that the latter can be placed on the shelves 2 or removed therefrom.

Next the mode of operation will be described.

As shown in FIG. 3, first the side walls 18 of the basket 5 are detached and the reduction catalyst elements 9 are placed on the catalyst element supporting member 11 while the ceramic shock absorbers 12 are interposed between the inner surfaces of the hollow body 10 and the reduction catalyst elements 9 and between the catalyst elements 9 as described above. Thereafter the side walls 18 are attached to the basket 5 so that a plurality of catalyst elements 9 charged into the basket 5 can be handled as a unit. As best shown in FIGS. 2 and 5, the baskets 5 each including a unit package of catalyst elements 9 are transported from a factory by means of a transportation means 24 and charged into the exhaust gas passage 1. Thereafter each basket 5 is placed on the shelves 2 by the basket transportation means 20.

As described above, the baskets 5 are stacked in the exhaust gas passage 1, whereby a denitration device is constructed in a simple manner.

The basket 5 are made of steel and are thermally expanded during the operation whereas the coefficient of thermal expansion of the catalyst elements 9 is substantially zero. Any possible space between the basket 5 and the catalyst elements 9 due to such difference in thermal expansion can be eliminated by the thermal expansion and elasticity of the ceramic shock absorbers 12 interposed between the catalyst elements 9. The ceramic shock absorbers 12 are also interposed between the inner surfaces of the hollow body 10 and the catalyst elements 9 so that the deformation loads are equally distributed and are absorbed by the inner surfaces. Thus the deformations of the hollow body 10 can be prevented.

The ash accumulation preventive member 13 serves to prevent the accumulation of ash in the space between the bottom of the basket 5 and the beams 3. It also functions as a reinforcing member which supports the load of the basket 5.

Next, a practical example of the present invention will be described. Each catalyst element is 150 mm in diameter and 1,000 mm in length and 64 catalyst elements are assembled as one unit in the basket 5. The side walls which define the hollow body 10 are 1,245 mm in length and 1,430 mm in height.

The suspension member 21 is securely attached at a position spaced apart from each corner by 150–200 mm and has a cross sectional area of 10–20 mm$^2$. It was observed that no ash was accumulated. When the cross sectional area of the supporting surface of the catalyst element supporting member 11 was set to 60 mm$^2$, the axial loads of the catalyst elements were satisfactorily received. Furthermore, the reduction in effective surface of the catalyst elements was as little as less than two percent.

The effective features and advantages of the present invention may be summarized as follows:

(1) The catalyst elements for denitration can be positively transported and placed without damages in the exhaust gas passage of the exhaust gas discharge system.

(2) A plurality of catalyst elements can be assembled and inserted as a unit into a relatively large diameter exhaust gas passage of a boiler or the like. As a result, the handling of catalyst elements can be much facilitated.

(3) The basket of the present invention can positively carry a plurality of catalyst elements and becomes a reactor for denitration when it is placed or inserted into the exhaust gas passage. In addition, the replacement of the baskets can be much facilitated.

(4) The basket is in the form of a steel hollow body through which the exhaust gases flow so that the ineffective surfaces of the catalyst elements relative to the passage of the exhaust gases can be minimized.

(5) The denitration device can be easily provided by simply placing the baskets in accordance with the present invention upon the shelves which are spaced apart from each other by a suitable distance in the exhaust gas passage.

(6) The baskets in accordance with the present invention are simple in construction and can be employed for denitration in the exhaust gas passage of an existing boiler or the like. They can find a wide range of applications.

What is claimed is:

1. In combination, a catalyst basket for denitration, shelves for supporting said basket, and an exhaust gas passage, said shelves being disposed in said exhaust gas passage and upon which basket dry $NH_3$ catalytic reduction catalyst elements are being placed, comprising a hollow body made of steel and detachably placeable on said shelves so as to permit exhaust gases to be denitrated to pass from one end of the body to the other end thereof, a catalyst element supporting member disposed at a bottom of said hollow body so as to permit the exhaust gases to pass, a plurality of catalyst elements supported by said catalyst element supporting member, said hollow body having at least one detachable side to enable said catalyst elements to be placed on said catalyst element supporting member, ceramic shock absorbers interposed between inner surfaces of said hollow body and the catalyst elements charged therein, and transportation means for said basket guided by said shelves.

2. A catalyst basket for denitration and for use with shelves which are disposed in an exhaust gas passage and upon which dry $NH_3$ catalytic reduction catalyst elements are to be placed, comprising a hollow body made of steel and detachably placeable on shelves so as to permit exhaust gases to be denitrated to pass from one end of the body to the other end thereof, a catalyst element supporting member disposed at a bottom of said hollow body so as to permit the exhaust gases to pass, a plurality of catalyst elements supported by said catalyst element supporting member said hollow body having at least one detachable side to enable said catalyst elements to be placed on said catalyst element supporting member, ceramic shock absorbers interposed between inner surfaces of said hollow body and the catalyst elements charged therein; and transportation means for supporting and guiding said basket by said shelves.

3. A basket according to claim 2 wherein said hollow body includes ash accumulation preventative means inclined downwardly from the bottom inner surfaces of said hollow body for preventing accumulation of ash contained in the exhaust gases flowing through said hollow body on said shelves supporting said hollow body.

4. A basket according to claim 2 wherein said hollow body includes a frame body and there are a plurality of side walls detachably connected to said frame body.

5. A basket according to claim 2 wherein said catalyst element supporting member is in the form of a grid.

6. A basket according to claim 2 wherein ceramic shock absorbers are also interposed between the catalyst elements charged into said hollow body.

7. A basket according to claim 2 wherein each of said shelves comprises a H-shaped steel beam and said transportation means is mounted so as to be supported and guided in travel along a lower flange of the beam.

* * * * *